United States Patent

Kurahashi et al.

[15] 3,665,246

[45] May 23, 1972

[54] SOLID STATE DISPLAY DEVICE

[72] Inventors: Koichiro Kurahashi, Osaka; Shigeki Ikebata, Takatsuki, both of Japan

[73] Assignee: Mitsubishi Electric Corporation, Tokyo, Japan

[22] Filed: June 8, 1970

[21] Appl. No.: 44,176

[30] Foreign Application Priority Data

June 14, 1969 Japan....................................44/46967

[52] U.S. Cl. ....................................315/169 R, 315/169 TV

[51] Int. Cl. ........................................................H05b 37/00

[58] Field of Search....................................315/169, 169 TV

[56] References Cited

UNITED STATES PATENTS

| | | | |
|---|---|---|---|
| 2,932,770 | 4/1960 | Livingston | 315/169 X |
| 2,995,682 | 8/1961 | Livingston | 315/169 |
| 3,509,408 | 4/1970 | Holz | 315/169 X |

OTHER PUBLICATIONS

" Electronics Review" Electronics, pp. 37– 39 October 31, 1966

*Primary Examiner*—Roy Lake
*Assistant Examiner*—Lawrence J. Dahl
*Attorney*—Oblon, Fisher & Spivak

[57] ABSTRACT

A solid state display device has stripe type conductive electrodes on both sides of an electroluminous layer in differing and crossing directions to each other to provide a matrix arrangement for selectively enabling a desired image to be formed. A non-crystalline switching type semiconductor is placed on said electroluminous layer to provide a memory capability for the display device upon obtainment of a light image. Switching elements are connected to each stripe type conductive electrode to enable the selective control of luminescence at a matrix point. The switch elements are selectively turned on and off in accordance with the generating of initiating pulses from a pair of electrode sources, whereby the image is controlled in the desired manner.

9 Claims, 4 Drawing Figures

INVENTOR
KOICHIRO KURAHASHI
SHIGEKI IKEBATA

BY Oblon, Fisher & Spivak
ATTORNEY

SOLID STATE DISPLAY DEVICE

BACKGROUND OF THE INVENTION

1. Field of Invention

This invention relates generally to solid state display devices and more particularly to a solid state display device having an electroluminous body in combination with a semiconductive type switching element for providing a memory capability.

2. Description of Prior Art

In general, selective scanning matrix type display devices having electroluminous type panels (hereinafter referred to as EL panels) have been used in numerous applications, such, for example, as in electroluminous thin type televisions.

In the past, one of the problems with the prior art electroluminous type display devices was that they had no manner for maintaining a residual luminant upon selection of a luminous point and therefore could give only an instantaneous radiation of luminant. As a result, the picture displayed was generally too dark. In order to overcome this problem, others have provided methods for prolonging the radiation period at a luminous point by providing a memory function for the scanning circuit. While generally somewhat satisfactory, the memory type electroluminous displays were extremely complex and required numerous separate memory circuits.

SUMMARY OF THE INVENTION

Accordingly, it is an object of this invention to provide a new and improved solid state display device wherein the lightness of the image displayed is remarkably increased.

Another object of the present invention is to provide a new and improved unique solid state display device having a semiconductive type switching element applied to an electroluminous layer for providing a memory function of the image displayed such that the lightness of the image is greatly increased.

It is still another object of this invention to provide a new and improved unique solid state display device wherein luminous points are selectively scanned by a trigger pulse and whereupon the luminescence of a particular point will be maintained after the removal of the trigger pulse applied thereto.

Yet still another object of this invention is to provide a new and improved solid state display device wherein the luminescence of a panel may be maintained for long periods of time by means of a non-crystalline semiconductor layer applied thereto and wherein the scanning means need be controlled only when an image change is desired.

One other object of this invention is to provide a new and improved unique solid state display device which avoids the need for providing semi-selected luminescence as has heretofore been required in matrix scanning type systems.

Briefly, in accordance with this invention, the foregoing and other objects are attained by providing an electroluminous panel formed of an electroluminous layer and a semiconductive type element applied thereto. First and second groups of stripe type conductive electrodes are respectively applied to the surfaces of said panel in a crossed relationship to each other. An electric voltage source of a value less than that required for initiating luminous radiation, but sufficient to maintain luminescence once initiated, is applied to the stripe shaped conductive electrodes. A separate pulse source is supplied to each of the stripe shaped electrodes and while each alone is insufficient to initiate luminous radiation from the electroluminous panel, the simultaneous application of both pulse sources will cause luminous radiation at a selected matrix point and further provide a memory function for the semiconductive type element.

BRIEF DESCRIPTION OF THE DRAWINGS

These and other objects and advantages of this invention will become more readily appreciated by reference to the following detailed description, when considered in connection with the accompanying Drawings, wherein.

DESCRIPTION OF THE PREFERRED EMBODIMENTS

Figures 1, 2, 3, 4:
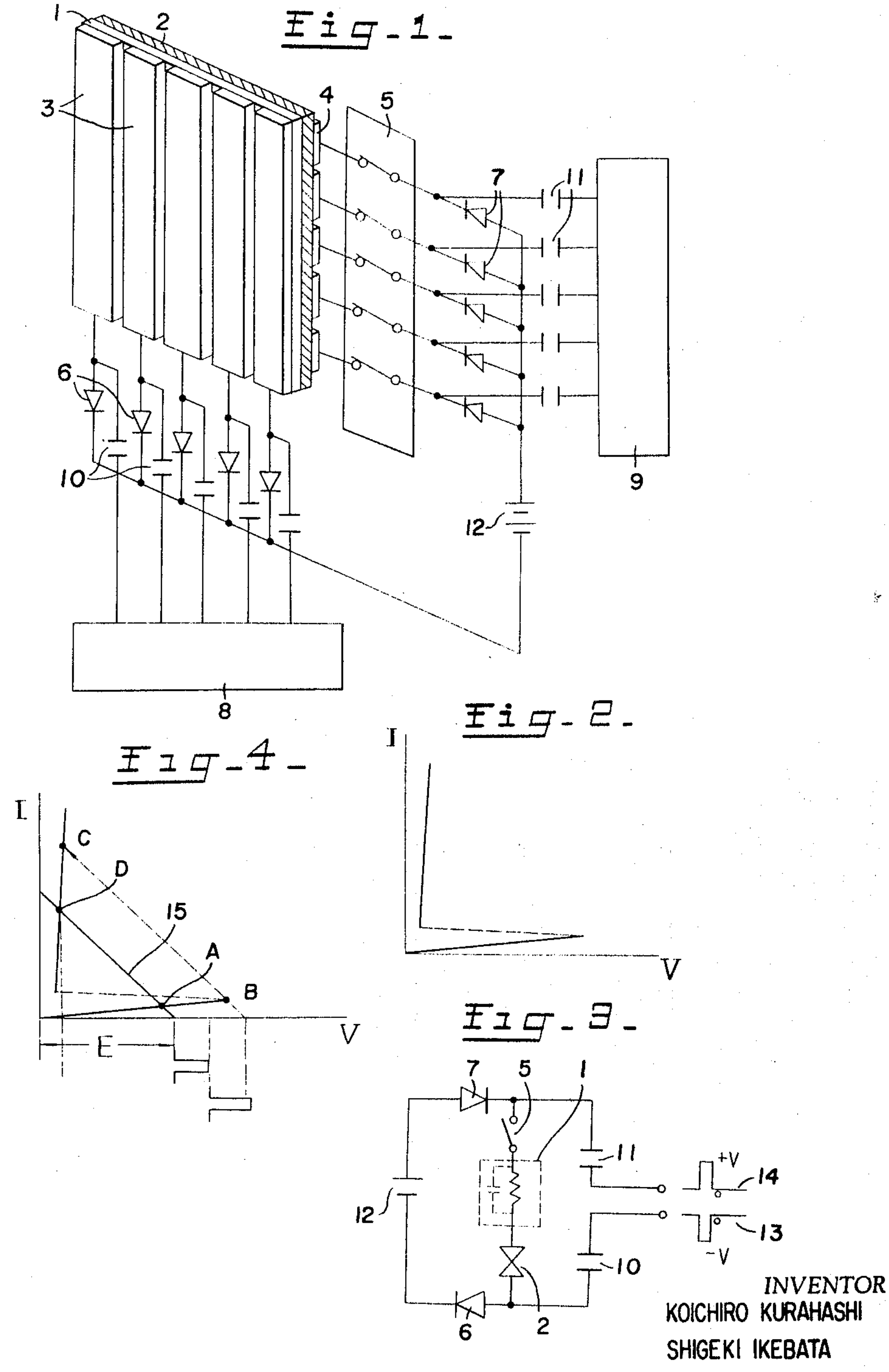
FIG. 1 is a schematic view of one embodiment of a solid state display device in accordance with this invention.
FIG. 2 is a voltage-current characteristic graph for the non-crystalline semiconductive used in FIG. 1.
FIG. 3 is an equivalent circuit diagram utilized for describing the image formed at a particular matrix point in the apparatus of FIG. 1; and, FIG. 4 is a graph showing the typical operational characteristics for the circuit of FIG. 3.

Referring now to the Drawings, wherein like reference numerals designate identical or corresponding parts throughout the several views, and more particularly to FIG. 1 thereof, wherein a schematic view of the present invention is shown as including an electroluminous (EL) panel 1 and a semiconductive type switching element 2 , which may be a non-crystalline semiconductor layer such, for example, as a glass semiconductor, attached thereto. The semiconductive element 2 may have the voltage-current current characteristics as shown in FIG. 2. A plurality of stripe type transparent electrodes 3 are connected in a vertical direction to the surface of the EL panel 1 and a plurality of stripe type electrodes 4 are connected in a horizontal direction to the surface of the semi-conductive element 2. A switching mechanism 5, which may, for example, include conventional transistors or thyristors, is provided for selectively allowing an electrical input signal to be applied to the stripe type electrodes 4. A plurality of diodes 6 are connected to respective ones of the stripe type transparent electrodes 3 and a plurality of diodes 7 are respectively connected to one side of the lead terminals of the switching mechanism 5. A negative polarity pulse generator 8 is provided and a plurality of outputs therefrom are connected through a plurality of respective capacitors 10 to the transparent electrodes 3. Additionally, a positive polarity pulse generator 9 is provided and a plurality of outputs therefrom are connected through a plurality of respective capacitors 11 and the switching mechanism 5 to the electrodes 4. A direct current source 12 is provided for biasing the plurality of diodes 6 and 7.

It should be understood that if the semiconductive element 2 is of the non-crystalline type that it may be connected to the back surface of the EL panel 1, for example, by first sintering a mixture of suitable amounts of Te, As, Si, and Ge to produce the glass type non-crystalline material and then cutting or forming a powder out of the same so that it may be coated with a suitable binder upon the EL panel 1. Alternatively, the glass type non-crystalline material may be vapor metallicized to the EL layer 1.

The operation of the apparatus for the display device as set forth above can be explained as follows. The voltage of the direct current source 12 is first set to a suitable value and each of the switches of the switching mechanism 5 will be placed in an on position. Under these conditions, the voltage applied to the EL panel 1 will be less than the value required for initiating a luminant radiation therefrom. When trigger pulses from both of the pulse generators 8 and 9 are simultaneously applied to the EL panel 1 along with the voltage from the direct current source 12, a sufficient voltage level will be reached to cause a luminant radiation to emit from the EL panel 1. Once a voltage of sufficient level is reached to cause luminant radiation at a given matrix point to occur, the radiation therefrom will then continue, because of the presence of the semi-conductive element 2, even after removal of the trigger pulses and solely in the presence of the direct current source 12. Accordingly, if the trigger pulses supplied at the output terminals of the pulse generators 8 and 9 are appropriately controlled to simultaneously supply pulses to intersecting points upon the matrix formed on the EL panel 1, then the same may be selectively caused to luminate and thereby form a desired image. When it is desired to eliminate or change the image so formed, each appropriate switch of the switching mechanism 5 will be turned off and since power will no longer be applied to the stripe type electrodes 4 connected to the switches 5, the luminescence will decease.

Referring now to FIG. 3, an equivalent circuit diagram of one image producing element is shown as formed at the intersecting point of one of the stripe type transparent electrodes 3 and one of the stripe type electrodes 4. The numerals 13 and 14, respectively, represent pulses generated at one of the output terminals of each of the pulse generators 8 and 9. The operation of the circuit of FIG. 3 can best be understood with reference to FIG. 4, which shows a graph of the operating characteristics for the circuit of FIG. 3.

In FIG. 4, the characteristic load line which is formed by the series connection of the equivalent EL panel circuit 1 and the semiconductive material 2 is designated by the numeral 15. In the absence of a trigger pulse 13 or 14, a voltage E solely due to the direct current source 12 will be present in FIG. 4 when the switch 5 is turned on. Under such circumstances, the non-crystalline semiconductor element 2 which has the characteristics shown in FIG. 2 will show a high electrical resistance and the point A will be the operating point on the load line 15 and as such no luminescence will be radiated from the EL panel 1 , because the necessary voltage will be too low. When, however, the trigger pulses 13 and 14 are simultaneously applied to the lead terminals of condensers 10 and 11, the circuit operating point will move from point A to point B and then suddenly move to point C. Upon removal of the trigger pulses 13 and 14, the circuit operating point will move to the point D and maintain that operating level. This sequence will occur due to the fact that when the trigger pulses 13 and 14 are both simultaneously applied, the non-crystalline semiconductor 2 will suddenly change to a low electrical resistance state and a voltage sufficient for causing luminescence will be applied to the EL panel 1. When the trigger pulses are removed, the non-crystalline semiconductor 2, as shown in the graph of FIG. 2, will keep its low electrical resistance value so that radiation from the EL panel 1 will continue at the operating point D. In order to eliminate the luminescence, the switching mechanism 5 must be turned off so as to prevent the direct current supply 12 from being applied to the EL panel 1. It should be understood that either trigger pulse 13 or 14 alone is not sufficient for changing the state of the semi-conductor 2 and thereby initiate radiation from the EL panel 1. In other words, either trigger pulse 13 or 14 will not be sufficient to change the non-crystalline material 2 to its low resistance state and accordingly a voltage sufficient to cause radiation will not be applied to the EL panel 1. Now, if the pulse generators 8 and 9 are controlled in a predetermined sequence then each image element of the apparatus shown in FIG. 1 being selected will be luminously excited one after the other or simultaneously in accordance with the predetermined sequence. The luminescence of a unit along a given line can be eliminated by turning off the corresponding switch in the switching system 5 which is applied to the stripe type electrode 4 for that line. In the case of sequential scanning, such as in providing the image in a television, if the switching mechanism 5 is controlled so that the sequence switch is turned off for a moment, prior to the output of the pulse generator 9, then the light image produced will illuminate during the desired field of scan. It should further be noted that if desired, the switching mechanism 5 can be controlled with a synchronizing type switch so that the pulse generating periods are synchronously turned on and off.

It should now be apparent that the apparatus of the present invention uniquely provides an inexpensive and easy to construct solid state display device which is capable of providing a predetermined light image for a given length of time despite the removal of initiating pulses from the EL body in accordance with the use of a semiconductive type switching element.

It should further be apparent that while the embodiment shown utilizes a direct current source 12 for continuously exciting the electroluminous panel once it is triggered that the invention is not so limited and that other sources, such, for example, as of the alternating or pulse type could equally be used for generating the desired voltage for maintaining a luminating condition once lumination has occurred.

Moreover, while the semiconductive type element 2 has been described as being a non-crystalline semiconductor, it should be understood that the invention is not so limited and that an avalanche transistor, a PNPN type switch element or the like could be equally used. However, because of present difficulties in the manufacture of large size monocrystalline elements , the same is not presently preferred.

Obviously, many modifications and variations of the present invention are possible in light of the above teachings. It is therefore to be understood, that within the scope of the teachings herein and the appended claims, that the invention may be practiced otherwise than as specifically described herein.

What is claimed and desired to be secured by Letters Patent of the United States is:

1. A solid state display device for a matrix selective system comprising:

an electroluminous panel formed of an electroluminous layer and a semiconductive layer applied thereto, said semiconductive layer having switching characteristics;

a first group of stripe type conductive electrodes being placed on one surface of said electroluminous panel ;

a second group of stripe type conductive electrodes being placed on another surface of said electroluminous panel and in a direction crossed to that of said first group, at least one of said groups of stripe type conductive electrodes being transparent;

a source for generating an electrical voltage less than the necessary value for initiating luminous radiation from said electroluminous panel, said necessary value being determined by the characteristics of said semiconductive layer and wherein said source is connected to both said first and said second group of stripe type conductive electrodes;

an electric pulse source which is connected to each of said first and said second stripe type conductive electrodes and wherein the voltage from said pulse source is less than said necessary value for initiating luminous radiation when only one of said first or said second group of stripe type conductive electrodes is impressed with said voltage, but is of said necessary value when both said first and said second group of stripe type conductive electrodes are simultaneously impressed with said voltage from said pulse source whereby at such time luminous radiation will occur and said semi-conductive layer will be provided with a luminous memory function.

2. A solid state display device according to claim 1, further including a plurality of impedances connected between said first and said second group of stripe type conductive electrodes and said source for generating an electrical voltage less than the necessary value for initiating luminous radiation.

3. A solid state display device according to claim 1, further including a plurality of impedances of the condenser type which are connected between said first group and said second group of stripe type conductive electrodes and said electric pulse source for providing said voltage over said necessary value for initiating luminous radiation.

4. A solid state display device according to claim 1, further including a switching element which is connected to at least one of said groups of said stripe type conductive electrodes whereby a luminous memory may be eliminated on at least a unit of a line along said stripe type conductive electrode connected to said switch element by turning off the same.

5. A solid state display device according to claim 1, further including a switching element which is connected to at least one of said groups of stripe type conductive electrodes and wherein a synchronous switchgear is provided and synchronized to the frequency of said pulse source whereby an image display may be periodically changed.

6. A solid state display device according to claim 2, wherein said plurality of impedances are diodes.

7. A solid state display device according to claim 1 wherein said source for generating an electrical voltage is a direct current source.

8. A solid state display device according to claim 1 wherein said electric pulse source includes a first pulse source of a positive polarity and a second pulse source of a negative polarity and wherein said first and second pulse sources are connected, respectively,to said first and said second group of stripe type conductive electrodes.

9. A solid state display device according to claim 1, wherein said semiconductive layer is of the non-crystalline type.

* * * * *